United States Patent Office 3,585,250
Patented June 15, 1971

3,585,250
SULFUR PROMOTED DEHYDROGENATION OF ORGANIC COMPOUNDS
Israel S. Pasternak, Mohan Vadekar, Abraham D. Cohen, and Noel J. Gaspar, Sarnia, Ontario, Canada, assignors to Esso Research and Engineering Company
No Drawing. Filed Dec. 2, 1968, Ser. No. 780,603
Int. Cl. C07c *5/20, 15/10*
U.S. Cl. 260—669
25 Claims

ABSTRACT OF THE DISCLOSURE

Organic compounds having a dehydrogenatable carbon-to-carbon bond are dehydrogenated in the vapor phase with sulfur and/or sulfur oxide dehydrogenation agents, the total dehydrogenation agent requirement being added incrementally at more than one point to the dehydrogenation zone, the total requirement of dehydrogenation agent being equal to the sum of the amounts of the several incremental additions, the reaction preferably being effected in the presence of a suitable low surface area catalyst and an inert diluent.

FIELD OF THE INVENTION

This invention relates to the vapor phase dehydrogenation of organic compounds. More particularly, this invention relates to an improved process for effecting the dehydrogenation of dehydrogenatable organic compounds, i.e., compounds having at least one

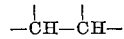

grouping wherein adjacent carbon atoms are bonded to each other and at least one hydrogen atom is bonded to each carbon atom, by contacting such compounds in the vapor phase at elevated temperatures with sulfur and/or sulfur oxide dehydrogenation agents which are added incrementally to the dehydrogenation zone at more than one point and the total dehydrogenating agent requirement is equal to the sum of the amounts added at the several points. Preferably, the reaction is effected in the presence of a suitable low surface area catalyst and an inert diluent.

PRIOR ART

The vapor phase dehydrogenation of organic compounds to produce unsaturated products, or products more unsaturated than the feed stock, in the presence of sulfur or sulfur-containing compounds, such as sulfur dioxide, has long been known to the art. See, for example, U.S. 2,126,817. Generally, it is believed that the sulfur dioxide effects dehydrogenation by abstracting hydrogens from the feed in accordance with the following generalized overall equation:

$$3C_nH_{2n+2} + SO_2 \rightarrow 3C_nH_{2n} + H_2S + 2H_2O \qquad (1)$$

which shows that one-third mole of sulfur dioxide is theoretically required to abstract one mole of hydrogen from the feed stock. By the same token, one-fourth mole of sulfur trioxide and one-half mole of sulfur are theoretically required to abstract one mole of hydrogen from the feed stock. While many such processes have been reported, the commercial development of the sulfur or sulfur oxide promoted dehydrogenation process has been rather permanently delayed due to serious problems involving coking in the reactor, short catalyst life, and burning of the feed stock. These disadvantageous reactions are enhanced or caused by the presence of sulfur-containing compounds in the reaction zone. Now, due to the desire to obtain economically feasible yields of dehydrogenated product, it has been the normal practice to employ sulfur-containing dehydrogenation agents greatly in excess of the theoretically required amount, for example, in U.S. 3,299,155 $SO_2$ to feed ratios of 1/1 to 2/1 are employed. Such quantities of the sulfur compound tend to lead to greatly increased coking rates and exceedingly short catalyst life spans. It has now been found, however, that excellent yields of dehydrogenated product can be obtained with relative long catalyst life spans by utilizing the sulfur-containing dehydrogenation agent as herein described.

SUMMARY OF THE INVENTION

In accordance with this invention, therefore, an improved process is provided for the vapor phase dehydrogenation of dehydrogenatable organic compounds which comprises passing the dehydrogenatable organic compound through a dehydrogenation reaction zone at elevated temperatures and adding to the reaction zone at more than one point a dehydrogenation agent selected from the group consisting of sulfur and sulfur oxides or a combination of these agents. Thus, the total dehydrogenating requirement will be equal to the sum of the several amounts added at different stages in the reaction zone. Preferably, the total amount of sulfur-containing dehydrogenating agent added to the reaction zone is no more than about one mole per mole of hydrogen abstracted. Still more preferably, an increasing number of addition points is generally desirable since the advantages of this invention increase with decreasing amounts of dehydrogenating agent addition at any one point. This invention also contemplates the use of equal or unequal dehydrogenating agent additions at the several addition points. The reaction is also preferably effected in the presence of a suitable low surface area catalyst and an inert diluent.

While not wishing to be bound by any particular theory, it is believed that the introduction of relatively large amounts of sulfur-containing dehydrogenating agents initially, i.e., with the feed, causes two detrimental effects:
(1) Burning of the feed stock, e.g.,

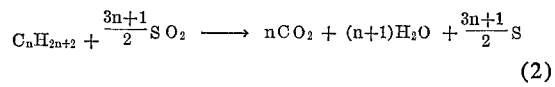

(2)

and (2) as the level of conversion of the feed stock increases, that is, the dehydrogenated product increases, there is competition for the sulfur-containing dehydrogenating agent by the feed and the unsaturated product with the consequent formation of undesirable sulfur-containing products, e.g., benzothiophene when ethylbenzene is dehydrogenated to styrene, and a lowering of the yield of desired product. However, it has been found that by limiting the amount of the dehydrogenating agent in the reaction zone at any one time the burning reaction is substantially reduced in favor of the primary reaction, i.e., dehydrogenation, the competition for the dehydrogenating agent between feed and product is less detrimental since only a small amount of the agent is formed, and the selectivity of the dehydrogenation reaction is greatly enhanced and selectively to desired product in excess of 85%, preferably in excess of 88% can be obtained throughout a relatively long reaction period.

The advantages of this invention can be readily achieved by adding the total requirement of sulfur-containing dehydrogenating agent in limited amounts i.e. less than the total amount, to the reaction zone at more than one point, including the feed point. Preferably, the total amount of dehydrogenating agent added to the reaction zone does not exceed about one mole per mole of hydrogen to be abstracted, depending upon the dehydrogenating agent to be employed. Preferred ranges for the total requirement of sulfur-containing compound added to the reaction zone are shown below in Table I.

TABLE I

| Total dehydrogenating agent per mole of $H_2$ abstracted | Broad range | Preferred range | Most preferred |
|---|---|---|---|
| S | 0.1–1.5 | 0.5–1.2 | 0.7–1.2 |
| $SO_2$ | 0.01–1.0 | 0.2–1.0 | 0.2–0.5 |
| $SO_3$ | 0.01–1.0 | 0.15–1.0 | 0.15–0.4 |

Now, while the total amount of sulfur-containing compound added is that shown above, the amount added at any one time is only a fraction of the total amount shown and, therefore, at least two additions of the sulfur-containing compound must be made. Further, since it is generally desirable to add as little sulfur compound as is consistent with reasonable conversion levels, Table II below shows the preferred single addition levels for each dehydrogenating agent (i.e., the incremental addition levels).

TABLE II

| Dehydrogenating agent per mole $H_2$ abstracted per addition | Preferred | Most preferred |
|---|---|---|
| S | 0.1–0.8 | 0.1–0.5 |
| $SO_2$ | 0.05–0.5 | 0.07–0.2 |
| $SO_3$ | 0.05–0.4 | 0.06–0.15 |

While sulfur, sulfur dioxide, and sulfur trioxide can all be employed as dehydrogenating agents, the water solutions of $SO_2$ and $SO_3$ can also be employed, the respective mole ratios being relative to the amount of $SO_2$ or $SO_3$ present in such water solutions. Additionally, the mole ratios are shown relative to the moles of hydrogen abstracted. This is believed to be the most meaningful method of reporting this relationship, since, for example, when ethylbenzene is dehydrogenated to styrene or butane to butene, one mole of hydrogen is abstracted; however, when butane is dehydrogenated to butadiene or ethane to acetylene, two moles of hydrogen are abstracted. The sulfur oxides are generally preferred dehydrogenation agents, particularly sulfur dioxide.

The process of this invention can be applied to a great variety of dehydrogenatable organic compounds to obtain the unsaturated derivatives thereof. A suitable dehydrogenatable compound can be any organic compound that contains at least one

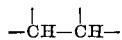

grouping, i.e., adjacent carbon atoms bonded to each other and each attached to at least one hydrogen atom. Preferably, such compounds have from 2 to about 20 carbon atoms. In addition to carbon and hydrogen, these compounds may also contain oxygen, halogens, nitrogen, and sulfur. Among the classes of organic compounds which can be dehydrogenated by this process are: alkanes, alkenes, alkyl halides, ethers, esters, aldehydes, ketones, organic acids, alkyl aromatic compounds, alkyl heterocyclics, cyanoalkanes, cyanoalkenes, and the like. Illustrative applications include: ethylbenzene to styrene, isopropyl benzene to α-methyl styrene, cyclohexane to benzene, vinyl cyclohexane or vinyl cyclohexane to styrene, ethane to ethylene, n-butane to butenes and butadiene, butene to butadiene, isobutane to isobutylene, methyl butene to isoprene, propionaldehyde to acrolein, ethyl chloride to vinyl chloride, propionitrile to acrylonitrile, methyl isobutyrate to methyl methacrylate, propionic acid to acrylic acid, ethyl pyridine to vinyl pyridine, and the like. Preferred dehydrogenatable feed stocks are the $C_2$–$C_{20}$ hydrocarbons, i.e., paraffins, alkyl benzenes, alkyl and alkenyl substituted cycloaliphatic compounds, and monoolefins. Particularly preferred, however, are $C_2$–$C_9$ paraffins, $C_3$–$C_9$ monoolefins, $C_8$–$C_{16}$ alkyl benzenes and $C_8$–$C_{16}$ alkyl and alkenyl substituted cycloaliphatic compounds, still more particularly $C_4$–$C_8$ monoolefins and paraffins, $C_8$–$C_{10}$ alkyl benzenes, and $C_8$–$C_{10}$ alkyl and alkenyl substituted cycloaliphatic compounds. Particularly effective as feed stocks are the olefinic hydrocarbons or alkyl benzenes or vinyl substituted cycloaliphatics which may be dehydrogenated to provide a product wherein the major unsaturated product has the same number of carbon atoms as the feed hydrocarbon. Ethylbenzene is a particularly preferred dehydrogenatable compound and its reaction with sulfur dioxide in accordance herewith results in ethylbenzene conversions in excess of 80%, preferably 85%, with selectivity to styrene in excess of 85%, preferably 90%, resulting in styrene yields in excess of 75%, preferably in excess of 80%.

In yet another embodiment, dehydrocyclization can also be effected. Thus, $C_6$–$C_8$ paraffins, e.g., hexane, heptane, octane, can be converted into $C_6$–$C_8$ aromatics, e.g. benzene, toluene, ethylbenzene, paraxylene.

The inert gas which may be employed to reduce the partial pressure of the reactants may be any gas normally inert under the conditions of the reaction. Illustrative of the gases that may be employed are: helium nitrogen carbon monoxide, carbon dioxide, steam, etc., as well as methane, waste gases containing methane, and mixtures of the foregoing. Preferably, however, the diluent is steam or a mixture of diluents which is primarily steam, e.g., steam and helium, steam and nitrogen, steam and carbon dioxide, etc.

The molar ratio of inert diluent to dehydrogenatable compound is not critical and may vary over a wide range as long as at least about 1 mole of diluent per mole of dehydrogenatable compound is present. This value, however, is merely an arbitrary limit at which the yield of dehydrogenated product becomes practical and economical. Molar ratios below this value will also show increases in yield, generally the conversion and yield increasing with increased dilution of the sulfur and/or sulfur oxide. The upper limit is not at all critical and larger amounts of diluent will only serve to further reduce the partial pressure of the reactants. Preferably, however, a molar ratio of 1 to 20, more preferably 1 to 8, of diluent to dehydrogenatable compound is employed. It will be obvious to one skilled in the art that this same result can be accomplished by operating under reduced pressures. However, use of an inert diluent is preferred, since it alleviates problems of vacuum equipment.

The conditions under which the reaction is effected are not generally critical and can be the conditions under which normal vapor phase catalytic dehydrogenation reactions are effected. Thus, reaction temperatures should be at least about 700° F., preferably 800 to 1500° F., and more preferably 900 to 1200° F. Similarly, pressures may vary widely and can range from subatmospheric, e.g., 0.1 atmosphere, to superatmospheric, e.g. 50 atmospheres or higher. Preferably, however, pressures may range from about 1 to 3 atmospheres.

As previously mentioned, it is desirable to employ low surface area catalysts for the reaction described herein. The low surface area requirement is necessitated by the fact that the catalyst must be selective to the desired reaction while minimizing undesired side reactions such as cracking and/or burning. Various catalysts can be employed which satisfy the low surface area criterion, among which are those that are or could be employed as catalyst support materials. These catalysts can also be described as difficultly reducible oxides or refractory oxides or mixtures of oxides and can be selected from the oxides of metals of Groups II–VII of the Perodic Chart of the Elements, preferably of Groups II–A, III–A, IV–A, IV–B, V–B, VI–B and VII–B and most preferably Groups IV–B and III–A. Suitable examples of such materials are magnesia, barium oxide, thoria, alumina, boria, vanadia, chromia, titania, silica, silica-alumina, tungsten oxide, zirconia, hafnium oxide and the like. Of these, silica, alumina, vanadia, magnesia, and titania are more preferred, particularly alumina and titania. It will be recognized that these catalysts need not start out as oxides but may be converted oxides during the course of the reaction. For example, a nitrate or hydroxide salt is readily converted to its corresponding oxide at reaction temperatures.

Another class of catalysts applicable to this invention and highly preferred are those based on titanium and oxygen, i.e., titanates. These catalysts have shown exceptional stability and give good yields of the desired dehydrogenated products. Applicable titanates are those wherein any metal from Groups I–VIII of the Periodic Chart of the Elements is combined with titanium and oxygen. Typically active titanates are: lithium titanate, barium titanate, cerium titanate, nickel titanate, lead titanate, strontium titanate, and the like. It is noted that titanium metal by itself, can also be employed successfully.

Additionally, such common support materials as silicon carbide; carbon, e.g., coke, graphite; diatomaceous earth, e.g., kieselguhr; clays, both natural and synthetic, e.g., attapulgite clays; magnesium silicates; phosphates, e.g., calcium nickel phosphate, aluminum phosphate; and the like which are of low surface area can also be employed, although somewhat less effectively than the other materials listed hereinabove.

Of course, all of the catalysts mentioned hereinabove are low surface area catalysts (as measured by nitrogen adsorption) and can be successfully employed in the dehydrogenation process. Nevertheless, it has also been found that a critical surface area range exists for many catalysts within which the yield of dehydrogenated product is markedly greater than would ordinarily be expected, as reported in Ser. No. 780,528. Thus, for example, alumina catalysts have a critical surface area range starting above a threshhold surface area of about 0.6 m.$^2$/gram where the yield of dehydrogenated product increases by about tenfold. While a critical upper limit where product yield falls off sharply does not exist as such, the increasing make of by-products and increased coking which accompany increasing surface area establishes a critical upper limit above which it becomes uneconomical to proceed with the reaction. Consequently, it is preferred that alumina catalysts have a surface area ranging from about 0.6 to 100 m.$^2$/gm., preferably about 0.6 to 50 m.$^2$/gm., and more preferably about 0.6 to 30 m.$^2$/gm.

The exact surface area levels for the catalysts which result in markedly increased product yields are not known with exactitude because of the many and varied catalysts which can be employed herein. Nevertheless, it is believed that one skilled in the art can readily determine these levels, particularly since the levels are thought to be rather similar to that determined for alumina, i.e., at least above about 0.5–1.0 m.$^2$/gram.

Now, it can be generally said that the higher the surface area, the more the coking and burning, the higher the quantity of sulfur oxide required for a given yield, and the lower the catalyst life. Taking these directions into consideration, lower surface areas are to be preferred and surface areas that are readily usable in the process of this invention, regardless of catalyst material, should range from about 0.1 m.$^2$/gm. to about 100 m.$^2$/gm., preferably 0.1 to 70 m.$^2$/gm., more preferably about 0.5 to 50 m.$^2$/gm., again keeping in mind minor variations depending upon choice of catalyst.

In another embodiment hereof, it has been found that a catalyst which incorporates a minor proportion of a metal or a metal salt, e.g., halides, phosphates, sulfates, etc., oxide, or hydroxide of an alkali or alkaline earth metal or of palladium promotes an increase in the yield of dehydrogenated product and often increases the life of the catalyst. Many of these salts, oxides, hydroxides or metals may change during the preparation of the catalyst, during heating in the reactor, prior to, or during the reaction or are converted to another form under the reaction conditions, but such materials still function as effective catalysts in this process. For example, many metals, metal nitrates, nitrites, carbonates, hydroxides, acetates, sulfites, sulfides, and the like, may be readily converted to the corresponding oxide under the defined reaction conditions. Salts such as phosphates, silicates, and halides are stable at reaction conditions, and are also effective in increasing catalyst life. At any rate, the catalysts are effective, if the listed metals or their compounds are present in a catalytic amount in contact with reaction gases. Preferred are the oxide and chlorides of the listed metals, as well as the metals themselves. Of the alkali metals, i.e., lithium, sodium, potassium, rubidium, and cesium, it is preferred to utilize sodium or potassium as the metals or derivatives thereof, most preferably sodium. Of the alkaline earth metals, i.e., beryllium, magnesium, calcium, strontium, and barium, it is preferred to utilize calcium or barium as the metals or derivatives thereof, most preferably barium. It is also noted that palladium, e.g., palladium chloride, acts similarly as the alkali or alkaline earth metals with regard to increasing both yield and catalyst life. While, generally, all of the metals will increase catalyst life, sodium and barium are particularly preferred since they are significantly effective in increasing yield in addition to increasing catalyst life. The amount of this added material is not generally critical and usually any amount will be helpful. Preferably, however, the added material will make up about 0.05 to 40 wt. percent of the catalyst, more preferably about 0.3 to 10 wt. percent.

In a typical reaction sequence involving this invention a feed charge containing ethylbenzene, sulfur dioxide and steam is charged to a suitable reactor containing an alumina catalyst incorporating a minor proportion of sodium oxide. The charge is vaporized and heated to reaction temperatures. As the feed passes through the bed additional increments of sulfur dioxide are added at one or more points in the catalyst bed to achieve the desired degree of conversion. The reaction product is quenched and cooled to about 500° F. where any sulfur formed is liquefied, removed for burning to $SO_2$, and recycled to the reactor. The main effluent is further cooled and remaining $H_2S$ and $CO_2$ is separated from the liquid products, styrene, unreacted ethylbenzene and water, and the $H_2S$ cnverted to sulfur, and thence to $SO_2$ for recycle. The crude styrene product is separated from the aqueous product and purified by distillation. Unreacted ethylbenzene is recycled and pure styrene is recovered for use.

In the case in which the feed and product are gaseous such as in the dehydrogenation of butene to butadiene, the reaction is carried out in the same manner but the hydrocarbon product is separated from the $H_2S$ and $CO_2$ in the product gases by adsorption and stripping. Purification and separation of butadiene from unreacted butylenes is carried out by conventional techniques.

Having now described the invention, the following examples will further serve to illustrate the inventive process. However, no limitations are to be implied from these examples since variations and modifications thereof will be readily apparent to those skilled in the art.

In the examples shown below to demonstrate the described process, ethylbenzene, water and sulfur dioxide are metered into a reactor consisting of a 1–2-inch diameter Vycor or stainless steel electrically heated tube. The reactants are preheated in the top part of the tube and then pass into a heated catalyst bed. At intermediate stages in the catalyst bed additional $SO_2$ with or without additional steam may be injected into the reactant stream. The products leave the reactor and pass through a water cooled condenser in which the water and hydrocarbon products are condensed. The products then pass into a separator in which the liquid products are drawn off and the gaseous products go off overhead. The water and hydrocarbon products are separated and weighed and the hydrocarbon is analyzed chromatographically. The gas rate and density are measured and the gas analyzed in a gas chromatograph. By this method a complete weight and material balance around the reactor is obtained.

Example 1

The following table shows that by adding 0.2 mole of $SO_2$ per mole of hydrogen abstracted at both atmospheric and 20 p.s.i.g. pressure, selectively to styrene in an ethylbenzene dehydrogenation of 96% can be obtained and maintained for a relatively long period, i.e., 36 hours. The catalyst was Ba on $TiO_2$ at temperatures of 1050° F., a space velocity of 0.3 w./w./hr. and $EB/SO_2/H_2O/He=1/0.2/2/0.5$.

TABLE III

| Time, hours | Conversion, percent | Selectivity, percent | Yield, percent |
|---|---|---|---|
| 4 | 51 | 96 | 49 |
| 12 | 52 | 96 | 50 |
| 20 | 52 | 96 | 50 |
| 28 | 52 | 96 | 50 |
| Repeat at 20 p.s.i.g. $H_2O$ diluent increased to 4.0 | | | |
| 4 | 48 | 92 | 44 |
| 12 | 50 | 95 | 47 |
| 20 | 49 | 96 | 47 |
| 28 | 48 | 96 | 46 |
| 36 | 46 | 96 | 44 |

Example 2

Similar results were obtained with an alumina catalyst containing a small amount of sodium oxide. With a 99.5% $Al_2O_3$-0.5% $Na_2O$ catalyst at 1175° F., an ethylbenzene space velocity of 0.3 w./w./hr. and $$EB/SO_2/H_2O/He=1/0.2/6.5/0.5$$

at 20 p.s.i.g. the following results were obtained.

|  | Percent |
|---|---|
| EB conversion | 65 |
| Styrene selectivity | 86 |
| Styrene yield | 56 |
| Feed burned | 2.6 |

When the $SO_2$ was increased to 0.4 mole per mole EB, all other conditions remaining as above, conversion increased but selectivity decreased as shown below:

$$EB/SO_2/H_2O/He=1/0.4/6.5/0.5$$

|  | Percent |
|---|---|
| EB conversion | 76 |
| Styrene selectivity | 80 |
| Styrene yield | 61 |
| Feed burned | 4.9 |

If the total amount of $SO_2$ was kept constant but added as 0.2 mole with the feed and a further 0.2 mole midway in the catalyst bed the following results were obtained:

|  | Percent |
|---|---|
| EB conversion | 79 |
| Styrene selectivity | 83 |
| Styrene yield | 65 |
| Feed burned | 2.5 |

It may be seen that both conversion and selectivity increased on staging by more efficient use of the sulfur dioxide.

Example 3

With a 1 mole percent barium on titania catalyst similar results were obtained. At 1125° F. and atmospheric pressure, at a 0.3 w./w./hr. ethylbenzene space velocity with $EB/SO_2/He/H_2O=1/0.2/1/2$ the following results were obtained.

|  | Percent |
|---|---|
| EB conversion | 59 |
| Styrene selectivity | 91 |
| Styrene yield | 54 |

When the $SO_2/EB$ was increased to 0.4, conversion increased but selectivity decreased, i.e.

|  | Percent |
|---|---|
| EB conversion | 87 |
| Styrene selectivity | 83 |
| Styrene yield | 72 |

When the $SO_2$ was divided into two parts, i.e. 0.2 $SO_2$ in with the feed and 0.2 $SO_2$ midway through the catalyst both conversion and selectivity increased, i.e.

|  | Percent |
|---|---|
| EB conversion | 88 |
| Styrene selectivity | 87.5 |
| Styrene yield | 77 |

At a lower space velocity, i.e. 0.15 w./w./hr. a similar effect was observed.

| $SO_2/EB$ | EB conversion, percent | Styrene selectivity, percent | Styrene yield, percent |
|---|---|---|---|
| 0.4 | 88 | 83 | 73 |
| 0.2+0.2 | 90 | 88 | 79 |

All these examples demonstrate the more efficient utilization of $SO_2$ when added in incremental stages over the case where the same amount of $SO_2$ is added with the feed.

Example 4

This example shows $SO_2$ dehydrogenation of ethylbenzene with $SO_2$ staging at 20 p.s.i.g. 5–7 moles of water diluent were added to the first stage.

TABLE IV

| Catalyst | Temp., °F. | Mole $SO_2$/mole EB 1st stage | Mole $SO_2$/mole EB 2d stage | Mole $SO_2$/mole EB 3d stage | EB space velocity, w./w./hr. | EB conversion, percent | Selectivity to styrene, mole, percent | Styrene yield, percent | Percent S recovered as $H_2S$ |
|---|---|---|---|---|---|---|---|---|---|
| Na/$Al_2O_3$ (3.5 m.²/g.) | 1,150 | 0.4 |  |  | 0.3 | 76 | 80 | 60 | 68 |
|  | 1,150 | 0.2 | 0.2 |  | 0.3 | 80 | 82 | 65 | 89 |
|  | 1,100 | 0.2 | 0.1 | 0.1 | 0.3 | 86 | 88 | 75 | 85 |
| Ba/$TiO_2$ (9 m.²/g.) | 1,100 | 0.2 | 0.1 | 0.1 | 0.5 | 84 | 87 | 73 | 61 |
|  | 1,000 | 0.2 | 0.1 | 0.1 | 0.3 | 81 | 86 | 69 | 36 |

What is claimed is:

1. A process for the dehydrogenation of a dehydrogenatable organic compound which comprises reacting in the vapor phase, at a temperature of above about 700° F. in a reaction zone, a feed mixture consisting essentially of a dehydrogenatable organic compound, an inert diluent in an amount of at least about 1 mole per mole of dehydrogenatable organic compound and a dehydrogenating agent selected from the group consisting of sulfur, sulfur oxides, and mixtures thereof, adding the total dehydrogenating agent requirement to the reaction zone at more than the feed point, the amount of dehydrogenating agent added at any one point being less than the total requirement, the reaction being conducted in the presence of a low surface area catalyst.

2. The process of claim 1 wherein the dehydrogenating agent is sulfur.

3. The process of claim 1 wherein the dehydrogenating agent is sulfur dioxide.

4. The process of claim 1 wherein the dehydrogenating agent is sulfur trioxide.

5. A process for the dehydrogenation of a dehydrogenatable organic compound which comprises, reacting in the vapor phase at temperatures ranging from about 800° F. to about 1500° F. in a dehydrogenation zone a feed mixture consisting essentially of a $C_2$–$C_{20}$ hydrocarbon having at least one $$-\overset{|}{C}H-\overset{|}{C}H-$$

grouping, an inert diluent in a molar ratio of diluent to hydrocarbon of at least about 1/1, and a dehydrogenating agent selected from the group consisting of sulfur, sulfur oxides, and mixtures thereof, adding the total dehydrogenating agent requirement to the reaction zone at more than the feed point, the amount of dehydrogenating agent added at any one point being less than the total requirement, effecting the reaction in the presence of a catalyst having a surface area ranging from about 0.1 to about 100 m.$^2$/gram.

6. The process of claim 5 wherein the dehydrogenating agent is sulfur dioxide and the total sulfur dioxide requirement ranges from about 0.1 to 1.0 mole per mole of hydrogen to be abstracted from the hydrocarbon.

7. The process of claim 6 wherein the amount of sulfur dioxide added at any one point ranges from about 0.05 to 0.5 mole per mole hydrogen to be abstracted from the hydrocarbon.

8. The process of claim 6 wherein there are two points of addition of the dehydrogenating agent.

9. The process of claim 5 wherein the catalyst is selected from the group consisting of oxides, salts or mixture of oxides of metals of Groups II–VII.

10. The process of claim 9 wherein the catalyst is alumina.

11. The process of claim 9 wherein the catalyst is titania.

12. The process of claim 9 wherein the catalyst is a titanate.

13. The process of claim 9 wherein the catalyst also contains a minor amount of member selected from the group consisting of metals, salts, oxides and hydroxides of alkali metals and alkaline earth metals.

14. The process of claim 5 wherein the hydrocarbon is selected from the group consisting of $C_4$–$C_8$ monoolefins and paraffins, $C_8$–$C_{10}$ alkyl benzenes, and $C_8$–$C_{10}$ alkyl and alkenyl cycloaliphatics.

15. The process of claim 8 wherein the catalyst is magnesia.

16. A process for the dehydrogenation of a dehydrogenatable organic compound which comprises, reacting in the vapor phase at temperatures ranging from about 900° F. to about 1200° F. in a dehydrogenation zone a feed mixture consisting essentially of a $C_2$–$C_{20}$ hydrocarbon having at least one

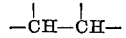

grouping, an inert diluent in an amount of about 1 to about 20 moles of inert diluent per mole of dehydrogenatable organic compound and sulfur dioxide, the total sulfur dioxide requirement ranging from about 0.01 to about 1.0 mole per mole of hydrogen to be abstracted from the hydrocarbon, adding the total sufur dioxide requirement to the reaction zone at more than the feed point, the amount of sulfur dioxide added at any one point being less than the total requirement and in the range of from about 0.05 to about 0.5 mole per mole of hydrogen to be abstracted from the hydrocarbon, the reaction being effected in the presence of a catalyst having a surface area ranging from about 0.1 to about 100 m.$^2$/grams.

17. The process of claim 16 wherein the total sulfur dioxide requirement ranges from about 0.2 to about 0.5 mole per mole of hydrogen to be abstracted from the hydrocarbon.

18. The process of claim 17 wherein the amount of sulfur dioxide added at any one point ranges from about 0.07 to about 0.2 mole per mole of hydrogen to be abstracted from the hydrocarbon.

19. The process of claim 18 wherein there are two points of addition of sulfur dioxide.

20. The process of claim 19 wherein the catalyst is selected from the group consisting of oxides, salts or mixtures of oxides of metals of Groups II–VII.

21. The process of claim 20 wherein the catalyst is alumina.

22. The process of claim 20 wherein the catalyst is titania.

23. The process of claim 20 wherein the catalyst is a titanate.

24. The process of claim 20 wherein the catalyst is magnesia.

25. The process of claim 24 wherein the hydrocarbon is selected from the group consisting of $C_4$–$C_8$ monoolefins and paraffins, $C_8$–$C_{10}$ alkyl benzenes, and $C_8$–$C_{10}$ alkyl and alkenyl cycloaliphatics.

References Cited

UNITED STATES PATENTS

| | | | |
|---|---|---|---|
| 2,418,374 | 4/1947 | Stone | 260—680 |
| 2,720,550 | 10/1955 | Danforth | 260—668 |
| 2,867,677 | 1/1959 | Murray | 260—683.3X |
| 3,006,944 | 10/1961 | Fenske et al. | 260—669X |
| 3,299,155 | 1/1967 | Adams | 260—669 |
| 3,361,839 | 1/1968 | Lester | 260—669 |
| 3,375,288 | 3/1968 | de Rosset | 260—669 |
| 3,403,192 | 9/1968 | Vadekar et al. | 260—669X |

C. R. DAVIS, Primary Examiner

U.S. Cl. X.R.

260—680E, 683.3